Figures 1, 2, 3:
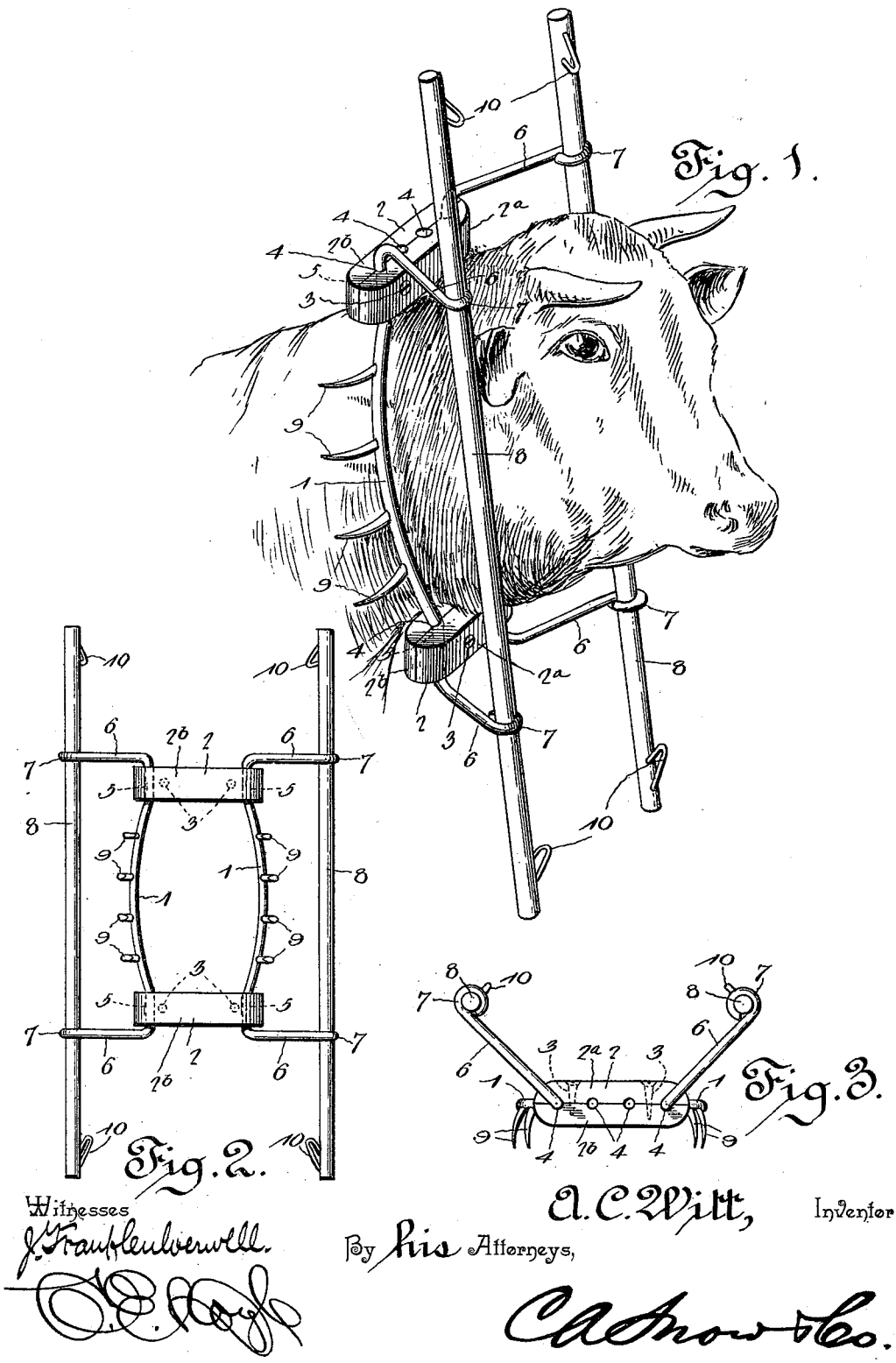

No. 622,311. Patented Apr. 4, 1899.
A. C. WITT.
ANIMAL POKE.
(Application filed Nov. 28, 1898.)
(No Model.)

Witnesses

A. C. Witt, Inventor.
By his Attorneys,

THE NORRIS PETERS CO., PHOTO-LITHO., WASHINGTON, D. C.

UNITED STATES PATENT OFFICE.

ALFRED C. WITT, OF KINGFISHER, OKLAHOMA TERRITORY.

ANIMAL-POKE.

SPECIFICATION forming part of Letters Patent No. 622,311, dated April 4, 1899.

Application filed November 28, 1898. Serial No. 697,653. (No model.)

*To all whom it may concern:*

Be it known that I, ALFRED C. WITT, a citizen of the United States, residing at Kingfisher, in the county of Kingfisher and Territory of Oklahoma, have invented a new and useful Animal-Poke, of which the following is a specification.

My invention relates to animal-pokes of that type constructed substantially in the form of a yoke for arrangement upon the neck of an animal and designed to prevent stock from jumping, passing through, or damaging the fences of inclosures in which they are confined; and the object in view is to provide an inexpensive and efficient device of the class named capable of adjustment to fit animals of different sizes and having means for inflicting more or less punishment, proportionate to the violence of the efforts made by the animal in attacking a fence or other barrier.

Further objects and advantages of this invention will appear in the following description, and the novel features thereof will be particularly pointed out in the appended claims.

In the drawings, Figure 1 is a view of a poke constructed in accordance with my invention applied in the operative position to the neck of an animal. Fig. 2 is a rear view of the poke. Fig. 3 is a plan view of the same.

Similar reference characters indicate corresponding parts in all the figures of the drawings.

The device embodying my invention consists, essentially, of a yoke for embracing the neck of an animal, said yoke consisting of side members 1, which are curved or bowed outwardly to bear against and follow approximately the contour of the sides of the animal's neck, and connecting upper and lower members 2, in which journal portions in said side members are mounted to turn, whereby the bows of the side members may be arranged otherwise than, as normally, in a common transverse plane. In the construction illustrated the connecting members 2 consist of blocks, each of which is sectioned and comprises elements $2^a$ and $2^b$, secured together by screws or bolts 3, and in the meeting or facing surfaces of these block elements are formed the bearings 4 for the journal portions 5 of the side members 1. In practice I prefer to provide each connecting member 2 with a plurality of bearings, the corresponding bearings of the two connecting members being alined vertically to adapt the journal portions of the side members to be arranged at an interval suiting the width of the neck to which the yoke is applied.

Extending forwardly and outwardly from the side members of the yoke are terminal arms 6, arranged, respectively, above and below the upper and lower connecting members 2 and having at their extremities vertically-alined eyes 7 for the reception of contact-bars 8. The arms 6 are inclined forwardly and outwardly from the planes, respectively, of the bowed portions of the side members 1, and they are held in this position normally by the contact of the bowed portions of said side members with the sides of the animal's neck, it being obvious that with an ordinarily snug fitting of the side members to the neck of the animal the bows of said side members will be held approximately in a common transverse plane, as hereinbefore indicated. Thus the contact-bars are normally disposed in front of the plane of the side members 1 and are the first to come in contact with a fence or other barrier toward which the animal advances. The contact of these bars, however, with an obstacle tends to swing the arm 6 rearwardly, thereby turning the journal portions of the side members in their bearings in the connecting members and throwing the bowed portions of the side members rearwardly out of a common transverse plane. Carried by these bowed portions of the side members are rearwardly-extending supports or projections 9, which when the bowed portions of the side members are in their normal position or a common transverse plane are terminally out of contact with the neck of the animal, but which by the rearward swinging of said bowed portions of the side members are brought into contact with the neck of the animal, and thus inflict more or less punishment, according to the force exerted against the contact-bars. Obviously as the animal presses forward the deflection of the bowed portions of the side members from a common transverse plane will be increased, and hence the points of the spurs will bear with greater force against the sides of the animal's neck, and at the same time any rearward tendency of the entire yoke due to the pressure against the contact-bars will serve to force the points of the spurs into the adjacent neck portion of the animal, thus deterring the animal from making further effort in a direction which causes inconvenience.

To catch in the wires or runners of a fence and prevent either jumping or rubbing, I preferably equip each contact-bar at its extremities with forwardly-extending detents or fingers 10, which preferably converge forwardly, the upper detents or fingers being inclined downward and the lower fingers upward, as clearly shown in the drawings.

To increase the efficiency of the spurs with which the side members of the yoke are provided, they are preferably curved inward toward their rear extremities or points; but they are so mounted upon the side members as to occupy a rearwardly-divergent position when the bows of the side members are in a common transverse plane, as will be seen by reference to Fig. 3.

Various changes in the form, proportion, and the minor details of construction may be resorted to without departing from the spirit or sacrificing any of the advantages of the invention.

Having described my invention, what I claim is—

1. An animal-poke having swiveled spur-carrying side members, and rearwardly-movable means connected with said side members for turning the latter to bring the spurs thereof into operation, substantially as specified.

2. An animal-poke having swiveled spur-carrying side members, arms connected with said side members for swinging movement to turn said side members, and means carried by the arms for contact with a barrier, substantially as specified.

3. An animal-poke having swiveled spur-carrying side members, arms connected with said side members for swinging movement, and contact-bars carried by said arms, substantially as specified.

4. An animal-poke having swiveled spur-carrying side members, arms connected with said side members for swinging movement, and contact-bars carried by said arms and having forwardly-extending detents or fingers, substantially as specified.

5. An animal-poke having swiveled spur-carrying side members, arms connected with said side members for swinging movement, and contact-bars carried by said arms and having forwardly-extending convergent detents or fingers, substantially as specified.

6. An animal-poke having swiveled spur-carrying side members, and forwardly and outwardly extending arms connected with said side members and carrying means for contact with an opposing object, substantially as specified.

7. An animal-poke having swiveled outwardly-bowed side members provided with spurs, and rearwardly-movable means, connected with said side members, for contact with an opposing object, substantially as specified.

8. An animal-poke having swiveled outwardly-bowed side members carrying rearwardly-extending spurs, and arms connected with said side members and carrying means for contact with an opposing object, substantially as specified.

9. An animal-poke having outwardly-bowed side members provided with spurs and journal portions, connecting members in which the journal portions of said side members are mounted, and rearwardly-movable means connected with the side members for contact with an opposing object, to impart movement to the side members, substantially as specified.

10. An animal-poke having outwardly-bowed and spurred side members provided with upper and lower journal portions and terminal arms, connecting members provided with bearings in which said journal portions of the side members are mounted to turn, and means carried by said terminal arms for contact with an opposing object, substantially as specified.

11. An animal-poke having outwardly-bowed and spurred side members provided with journal portions and terminal arms, connecting members, each having a plurality of bearings alined with corresponding bearings of the other member, for the reception of the journal portions of said side members, and means carried by said terminal arms for contact with an opposing object, substantially as specified.

12. An animal-poke having outwardly-bowed and spurred side members provided with journal portions and terminal arms, connecting members consisting of sectional blocks having alined bearings in which the journal portions of said side members are mounted, said blocks having their elements provided in their facing sides with registering half-bearings, and means for securing the elements of each block together, and contact devices carried by said arms, substantially as specified.

In testimony that I claim the foregoing as my own I have hereto affixed my signature in the presence of two witnesses.

ALFRED C. WITT.

Witnesses:
WM. THROCKMORTON,
D. BADGER.